Nov. 3, 1970    R. SEIFERT ET AL    3,537,333
WELDED HOLLOW CRANKSHAFT FOR A MULTICYLINDER PISTON-ENGINE
Filed Nov. 18, 1968    2 Sheets-Sheet 1

INVENTORS
RICHARD SEIFERT
KARL JUST

BY Craig & Antonelli
ATTORNEYS

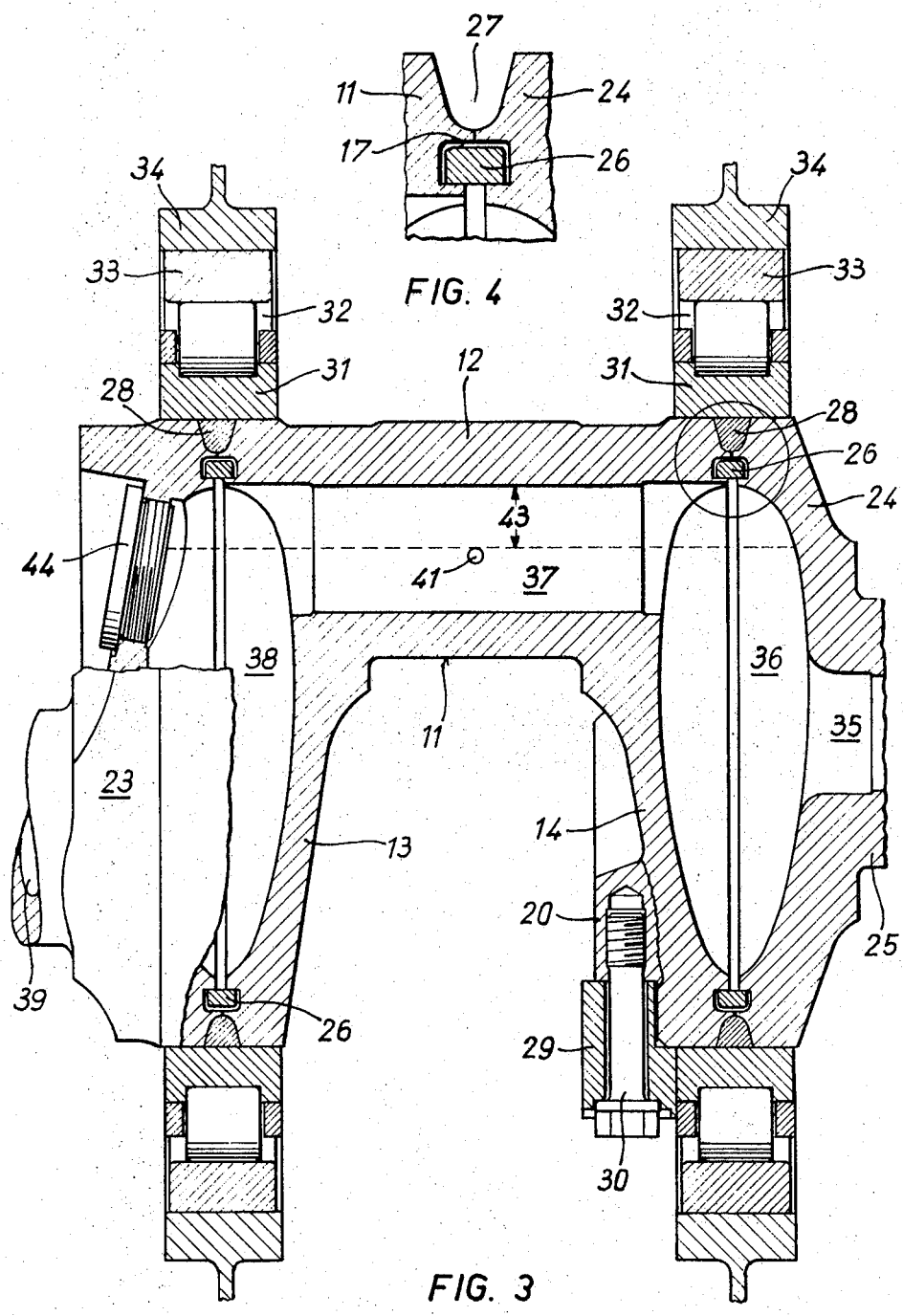

United States Patent Office 3,537,333
Patented Nov. 3, 1970

3,537,333
WELDED HOLLOW CRANKSHAFT FOR A MULTICYLINDER PISTON-ENGINE
Richard Seifert, Friedrichshafen-Manzell, and Karl Just, Immenstaad (Bodensee), Germany, assignors to Maybach Mercedes-Benz Motorenbau G.m.b.H., Friedrichshafen, Germany
Filed Nov. 18, 1968, Ser. No. 776,635
Claims priority, application Germany, Nov. 29, 1967, 1,625,579
Int. Cl. F01b 31/00
U.S. Cl. 74—597
17 Claims

ABSTRACT OF THE DISCLOSURE

A crankshaft and method of making the same, especially for multipiston internal combustion engines which is supported in the engine on crankwebs by way of bearings; the crankshaft is composed of several pieces welded together between the shaft journal bearings which are basically similar and each include a crankpin and a crankweb section; the crankweb sections of two adjacent pieces are welded together in such a manner as to avoid the formation of scale on the inside of the crankshaft so as to permit conduction of oil therethrough; this is achieved in that each crankweb section is provided, going in the radially outward direction, with a shoulder forming a seat for a centering ring, a groove for the centering ring and a welding terminal for a bell-seam; the groove thus formed has greater dimensions in the axial and radial directions than the centering ring so that the centering ring is spaced on at least three sides from the crankweb sections whereby the heat developed during welding is conducted directly into the crankweb sections without the formation of scale on the inside of the crankshaft.

---

The present invention relates to a hollow crankshaft conducting lubricating oil from its inside to the lubricating points on its outer surface, for a multicylinder piston-engine, especially for an internal combustion piston engine, in which the crankshaft is supported on disc-shaped crankwebs provided with bearing races; the crankshaft is welded together by means of bell-seams from pieces, basically similar between two shaft journal bearings, these pieces each including a crankpin and a crankweb-half adjacent to the crankpin, and being centered by a ring for the purpose of welding.

The hollow spaces of the crankshafts of the prior art (Austrian Letters Patent 223,879) could not be utilized for the conduction of lubricating oil due to the formation of scale during the welding operation, which can be removed only with great difficulties.

This disadvantage is overcome in the present invention by combining the following features:

(a) The inner surface of each web-section is basically shaped like a spherical segment which passes over into an annular shoulder as for the centering ring;

(b) Following the annular shoulder, a groove surrounding the centering ring radially and axially with a predetermined spacing is arranged radially toward the outer circumference of the web-section, which groove is delimited by a welding lip or terminal for the bell-seam;

(c) The outer surface of the web-sections is slightly conically shaped, and the axis of the cone center coincides approximately with the crankpin or shaft axis, respectively;

(d) At least one of the web-sections is provided with an approximately crescent-shaped means for attaching an counterweights, to which additional weights can be fitted, if required;

(e) At least one of the sections of a crankweb includes several preferably two cleaning-bosses provided with cleaning bores, of which one is preferably arranged in the direction pointing towards the crankpin following the opposite web-section.

According to one embodiment of a crankshaft in accordance with the present invention the center axis of the spherical segment on the inner surface of the web-section is slightly inclined towards the crankshaft axis. As a result thereof, a more effective counter-balance is achieved.

This effect can be still further increased by decreasing the radii of the inner surface starting from the spherical segment radius towards the outer circumference.

The construction of the crankshaft in accordance with the present invention results also in an extremely favorable closed linkage between the slip-joint of the crank disc and the inner race of the shaft bearing, especially if this bearing race belongs to an antifriction bearing.

In order to attain largest possible sludge traps, the hollow crankpins, which are eccentric to the crankshaft center, are provided on their outer surfaces with diametrically opposite lubricating oil inlets on the inner surfaces.

A further feature and advantage of the crankshaft according to the present invention is based on the fact that it is inertia-compensated. When it is balanced, only the manufacturing differences need to be compensated.

Accordingly, it is an object of the present invention to provide a crankshaft for piston engines which avoids the aforementioned shortcomings and drawbacks encountered in the prior art by extremely simple means.

Another object of the present invention resides in a crankshaft which can be used directly for the guidance on the inside thereof of lubricating oil to external lubricating places.

A further object of the present invention resides in a crankshaft enabling a more effective counterbalancing.

Still a further object of the present invention resides in a crankshaft which, after balancing, requires compensation only for manufacturing differences and inaccuracies.

Still another object of the present invention resides in a crankshaft which can be economically manufactured and assembled.

These and further objects, features and advantages of the present invention will become more obvious from the following description, when taken in connection with the accompanying drawing which shows, for purposes of illustration only, one embodiment in accordance with the present invention and wherein:

FIG. 3 is a longitudinal cross sectional view of the end section of a crankshaft in accordance with the present invention, installed into the crankcase, and FIG. 4 is a longitudinal cross sectional view, on an enlarged scale, illustrating the details encircled in FIG. 3.

Figure 1:
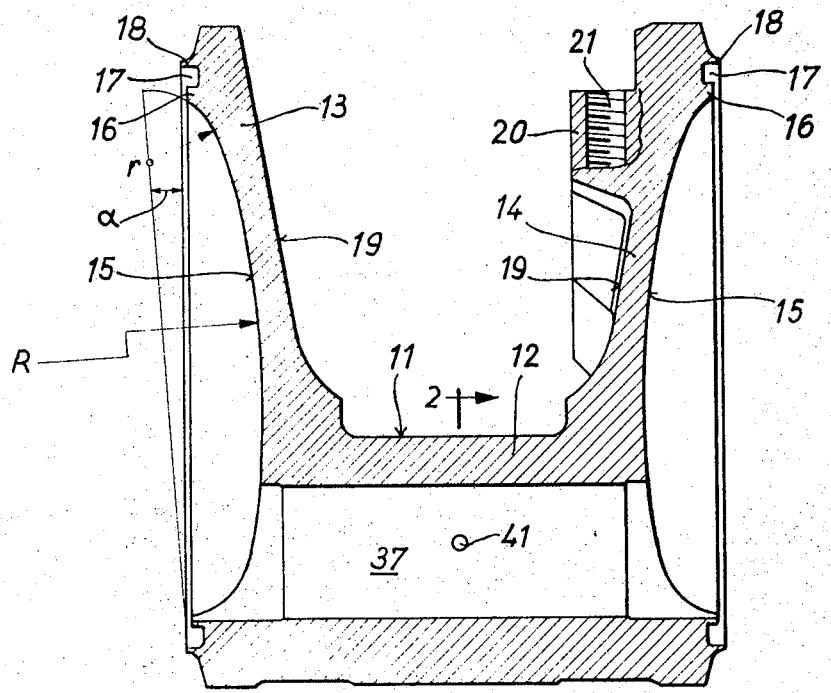
FIG. 1 is a longitudinal cross sectional view through an intermediate piece of the crankshaft in accordance with the present invention.
Figure 2:
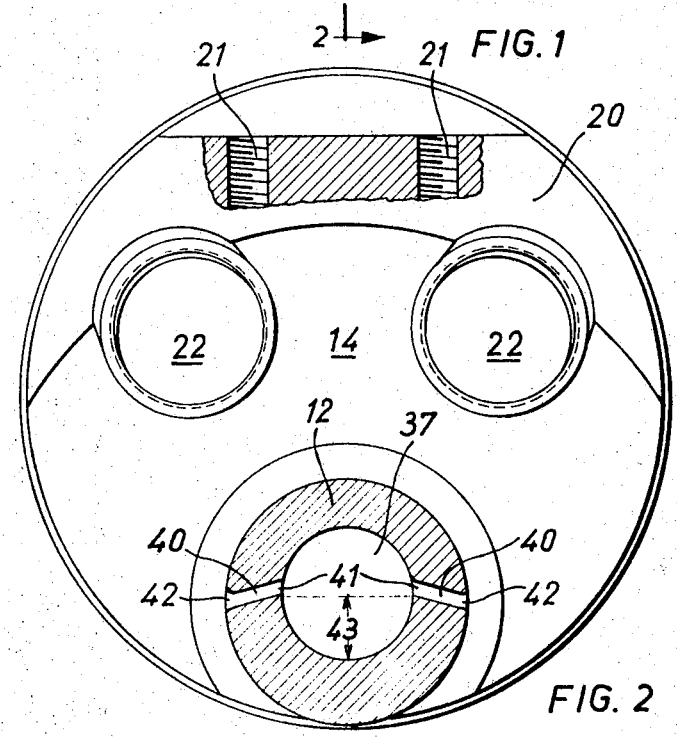
FIG. 2 is a cross sectional view taken along line 2—2 of FIG. 1.

Referring now to the drawing wherein like reference numerals are used throughout the various views to designate like parts, the intermediate piece generally designated by reference numeral 11 consists of a hollow crankpin 12 which is eccentrically arranged to the center axis of the crankshaft, and of two web-halves 13 and 14. The inner surfaces of the web-halves 13 and 14 are essentially shaped in the form of a spherical section 15, which passes over into an annular shoulder 16. Adjoining this annular shoulder 16, a groove 17 is provided radially outwardly of the web-section, which groove is bordered by a welding lip or welding terminal 18. The center axis of the spherical section 15 situated on the inside of the web-halves 13 and 14 is slightly inclined towards the axis of the crankshaft, as indicated by the angle of inclination $\alpha = 4°$ (for example). The radii of the inside decrease from the radius R of the spherical section into smaller radii r.

The outer surfaces of the web-halves 13 and 14, facing the crankpin 12 are shaped like a shallow cone 19. The axis of the cone center coincides with the axis of the crankpin 12. The web-half 14 is provided with an approximately cresent-shaped counterweight mount or support 20, within which are provided threaded holes 21. The web-half 14 contains two cleaning apertures 22 provided in corresponding bosses which can be closed by plugs. One of these apertures 22 is arranged in the direction pointing towards the crankpin adjoining the other web-half.

The end section of the finished crankshaft, as shown in FIG. 3, comprises the piece 11, a piece 23 and the end piece 24 with the crankshaft journal 25.

According to FIG. 4, a centering ring 26 is inserted into the end piece 24. This centering ring 26 is fixed by means of welding spots at several points of the circumference. The piece 11 is fitted onto the centering ring 26. Into the thus formed tulip-shaped space 27 is applied the usual bell-seam or U-shaped seam 28 (FIG. 3). Since, according to the present invention, the groove 17 surrounds the centering ring 26 with a radial and axial spacing, the heat developing during the welding operation is conducted into the webhalves, thereby preventing the formation of scale on the inner surface. Consequently, the oil is not contaminated when proceeding through the crankshaft later on.

If required, the counterweight 20 can be increased by the addition of a weight 29 secured by means of bolts 30. The crankwebs assembled from pieces 11/24 and 11/23, respectively, are provided with inner races 31 belonging to roller bearings 32, the outer races 33 of which are normally fitted in the crankcase 34 of, for example, a piston-type compression-ignition engine. Together with the cages of the roller bearings 32, the crankshaft can be inserted into this housing 34, standing in the vertical position during the assembly, with the outer races 33 forming a kind of a tunnel.

The lubricating oil is supplied under pressure through the hollow end journal 35, and flows through the thoroughly clean and scale-free hollow spaces 36 of the end web and through the spaces 37 of the crankpin 12 into the hollow space 38 of the following web, through the inner space 39 of the next crankpin, and so forth.

According to the present invention, the hollow spaces 37 and 39 of the crankpins are displaced eccentrically to the outside. The crankpins are provided with two opposed lubrication bores 40, whose openings 41 are positioned diametrically opposite to the openings 42. As a result of the inclined position of bores 40, a large sludge trap 43 is obtained between the openings 41 in the hollow spaces 37 and 39 of the crankpin.

For cleaning the hollow spaces of the crankshaft the plugs 44 (FIG. 3) are removed, and sludge which might have settled there is flushed out.

A crankshaft according to the present invention may be manufactured according to the following method:

(a) Turning the outside of the rough-forged piece, and more particularly the crankpin and the web-halves about a center axis in one setting;

(b) Heat-treating of this piece;

(c) Finishing of the inner surface, over which flows the lubrication oil later on;

(d) Mounting of the centering ring to one web-half, and securing it against rotation and twisting, e.g., by four welding spots;

(e) Fitting of the counter web-half onto the centering ring;

(f) Welding-together of the adjacent pieces by means of bell-seams;

(g) Finishing of the welding seams and fitting of the inner bearing races.

While we have shown and described only one embodiment in accordance with the present invention, it is understood that this invention is not limited thereto but is susceptible of numerous changes and modifications as known to a person skilled in the art, and we therefore do not wish to be limited to the details shown and described herein but intend to cover all such changes and modifications as are within the scope of those skilled in the art.

It is claimed:

1. A hollow crankshaft operable to conduct oil from its inside to the lubricating points on its outer surface, for a multicylinder piston-engine, especially for an internal combustion piston engine, in which the crankshaft is supported on substantially disc-shaped crankweb means provided with bearing races, the crankshaft being welded together by means of bell-seams, from pieces of basically similar shape between two shaft journal bearings, each piece including a crankpin and a crankweb-section adjacent to the crankpin, and the pieces being centered by a ring for the purpose of welding, characterized by:

(a) the inner surface of each web-section being basically shaped like a spherical segment and passing over into an annular shoulder to accommodate the the seat of the centering ring;

(b) following the annular shoulder, a groove being provided radially towards the outer circumference of the web-section which surrounds the centering ring radially and axially with a predetermined spacing, and a welding terminal for the bell-seam being provided adjacent to the groove;

(c) the outer surface of the web-sections being slightly conically shaped, and the axis of the cone center approximately coinciding with the crankpin or shaft axis, respectively;

(d) at least one of the web-sections being provided with an approximately cresent-shaped means for attaching counter-weights, to which additional weights can be fitted if required; and (e) at least one of the sections of a crankweb means including several cleaning-bosses, one of which being preferably arranged to point towards that crankpin following the opposite web-section.

2. A crankshaft according to claim 1, characterized in that the center axis of the spherical segment on the inner surface of the web-section is slightly inclined towards the crankshaft axis.

3. A crankshaft according to claim 2, characterized in that the radii of the inner surface decrease starting from the spherical segment radius towards the outer circumference.

4. A crankshaft according to claim 3, characterized in that the hollow crankpins, which are arranged eccentrically to the crankshaft center, are provided on their outer surface with substantially diametrically opposite lubricating oil discharge means, which are connected to substantially diametrically opposite lubricating oil inlet means on the inner surface.

5. A crankshaft according to claim 4, wherein two cleaning bosses are provided.

6. A crankshaft according to claim 1, characterized in that the hollow crankpins, which are arranged eccentrically to the crankshaft center, are provided on their outer surface with substantially diametrically opposite lubricating oil discharge means, which are connected to substantially diametrically opposite lubricating oil inlet means on the inner surface.

7. A hollow crankshaft operable to conduct oil from its inside to lubricating points on its outer surface, which is rotatably supported on substantially disc-shaped crankweb means and which is welded together from individual pieces between two shaft bearings, each piece including a crankpin and crankweb section means, adjacent crankweb section means of two adjoining pieces being of substantially complementary shape and being welded together by a bell-seam or the like, characterized by centering ring means for the purpose of welding together complementary crankweb section means, said crankweb section means being provided with groove means forming seat means for the centering ring means, the space formed by the groove means of two complementary crankweb section means being of greater dimension in the axial and radial direction than the centering ring means, and welding terminal means in the crankweb section means radially outwardly of the groove means for the bell-seam.

8. A crankshaft according to claim 7, characterized by aperture means provided in at least some of the crankweb section means.

9. A crankshaft according to claim 8, wherein several aperture means are provided in some of the crankweb section means, of which one points in the direction toward the crankpin of the opposite, complementary crankweb section means.

10. A crankshaft according to claim 7, characterized by attachment means on at least one of the crankweb section means for the attachment of counterweights.

11. A crankshaft according to claim 7, characterized by the inner surface of each crankweb sections means being basically shaped like a spherical segment and passing over into an annular shoulder to accommodate the seat means.

12. A crankshaft according to claim 11, characterized in that the center axis of the spherical segment on the inner surface of the web-section means is slightly inclined towards the crankshaft axis.

13. A crankshaft according to claim 12, characterized in that the radii of the inner surface decrease starting from the spherical segment radius towards the outer circumference.

14. A crankshaft according to claim 13, characterized by the outer surface of the crankweb section means being slightly conically shaped, and the axis of the cone center approximately coinciding with the crankpin or shaft axis, respectively.

15. A crankshaft according to claim 7, characterized in that the hollow crankpins, which are arranged eccentrically to the crankshaft center, are provided on their outer surface with substantially diametrically opposite lubricating oil discharge means, which are connected to substantially diametrically opposite lubricating oil inlet means on the inner surface.

16. A method of manufacturing a crankshaft, characterized by the following steps:
 (a) turning the outside of the rough-forged piece, i.e., the crankpin and the web-halves in one setting, about the center axis;
 (b) heat-treating of this piece;
 (c) finishing of the inner surface, which is to be covered later on by the lubrication oil;
 (d) mounting of the centering ring in one web-half, and securing it against twisting;
 (e) fitting of the counter web-half onto centering ring;
 (f) welding together of the adjacent pieces by means of bell-seams; and
 (g) finishing of the welding seams.

17. A method according to claim 16, characterized by the step of finally fitting the bearing inner races over the crankwebs prior to installation of the crankshaft into the engine.

References Cited
UNITED STATES PATENTS

| | | |
|---|---|---|
| 1,731,215 | 10/1929 | Noble. |
| 2,256,726 | 9/1941 | Rippingille _____ 74—597 |
| 2,729,117 | 1/1956 | Maybach et al. _____ 74—596 |

FRED C. MATTERN, Jr., Primary Examiner

F. D. SHOEMAKER, Assistant Examiner

U.S. Cl. X.R.

29—6